United States Patent [19]
McDuffie et al.

[11] 3,971,390
[45] July 27, 1976

[54] STONE TRAP FOR THRESHING AND SEPARATING MACHINE

[75] Inventors: James W. McDuffie; Claude K. Focht, both of New Holland; Edward W. Rowland-Hill, Lancaster, all of Pa.

[73] Assignee: Sperry Rand Corporation, New Holland, Pa.

[22] Filed: June 3, 1974

[21] Appl. No.: 476,021

[52] U.S. Cl. .............................. 130/27 JT; 56/10.2; 56/DIG. 15; 209/82
[51] Int. Cl.² ....................................... A01F 12/10
[58] Field of Search ............ 130/27 JT, 27 E, 27 P, 130/27 T, 27 S, 27 J, 27 L, 27 R; 56/10.2, DIG. 15; 209/82

[56] References Cited
UNITED STATES PATENTS 2,959,175  11/1960  Oberholtz et al. ............... 130/27 JT
3,805,798  4/1974  Girodat ........................ 130/27 JT

*Primary Examiner*—J.N. Eskovitz
*Attorney, Agent, or Firm*—John R. Flanagan; Frank A. Seemar; Joseph A. Brown

[57] ABSTRACT

The stone trap of the present invention is used in cooperation with the crop elevator of a threshing and separating machine. The crop elevator has an opening positioned in its bottom wall along the path of the incoming crop material. A pivotally mounted door is positioned above the opening. A lip is rigidly mounted around the periphery of the opening and extends below the crop elevator. This lip maintains the door in a closed position until the door has moved through a predetermined distance. The movement of the door is determined by the operation of a controlling means mounted to both the door and the crop elevator and a force exerting means operably associated with the controlling means.

13 Claims, 8 Drawing Figures

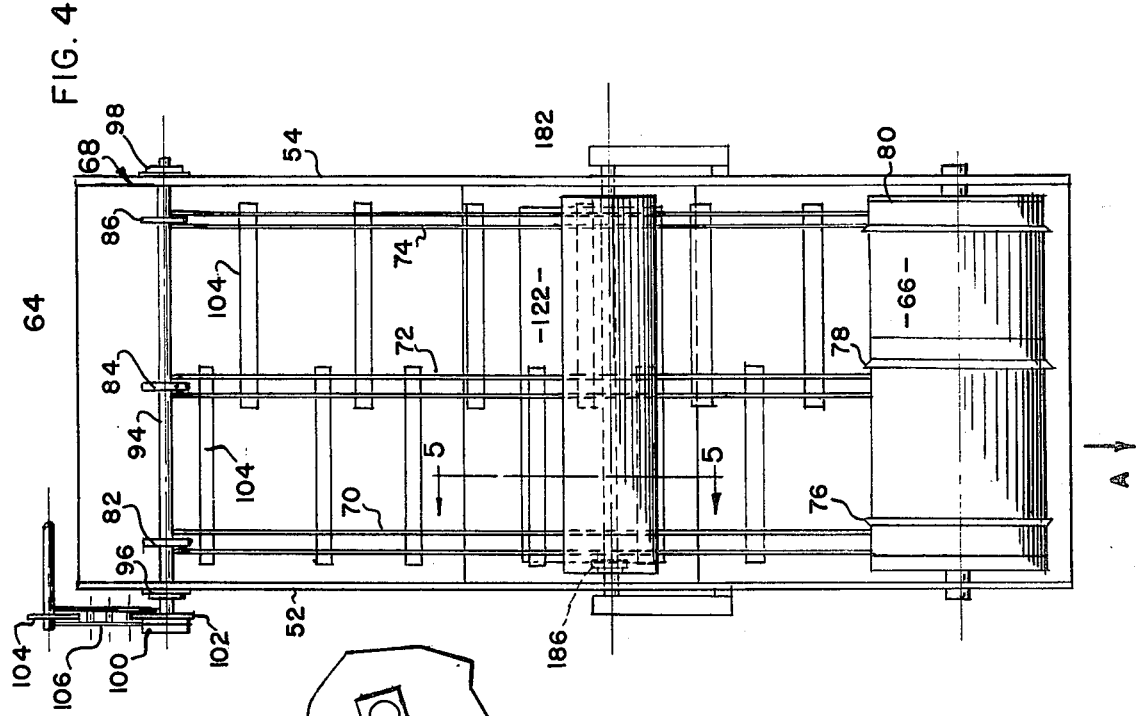
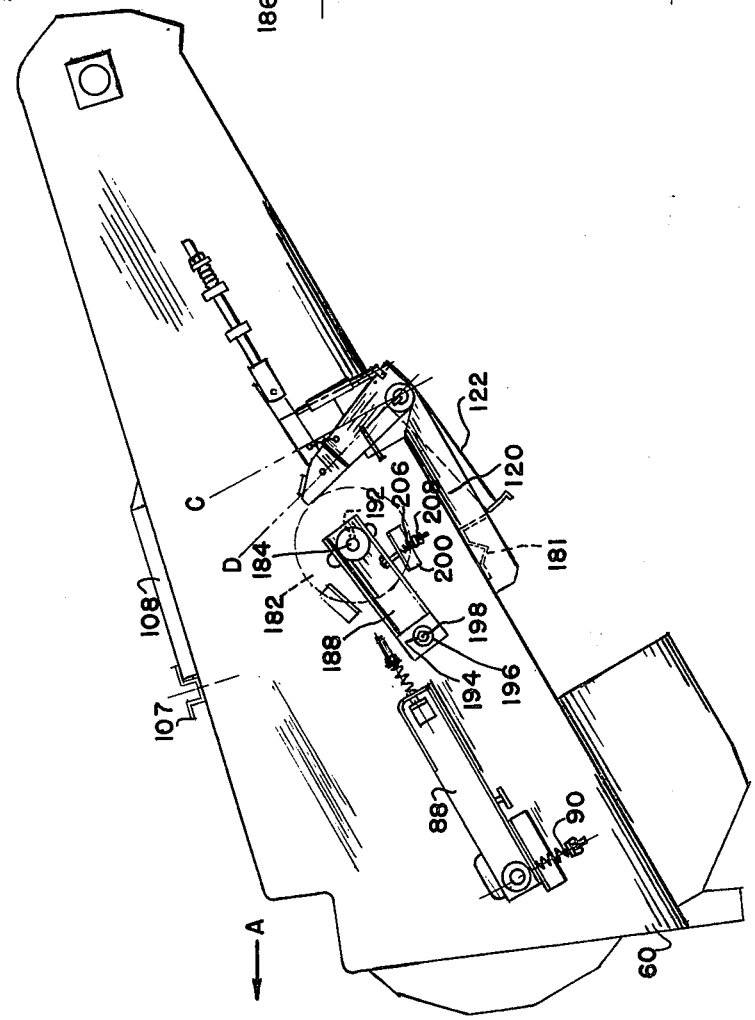

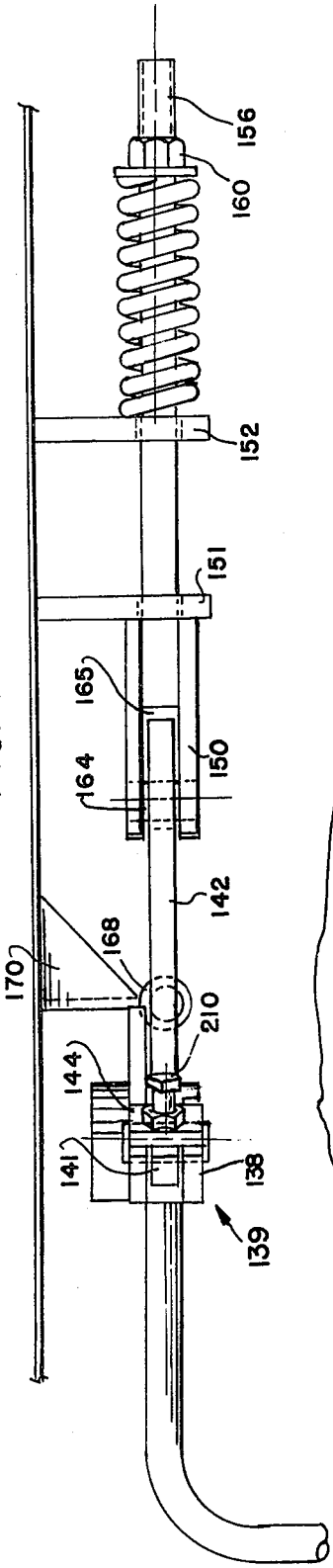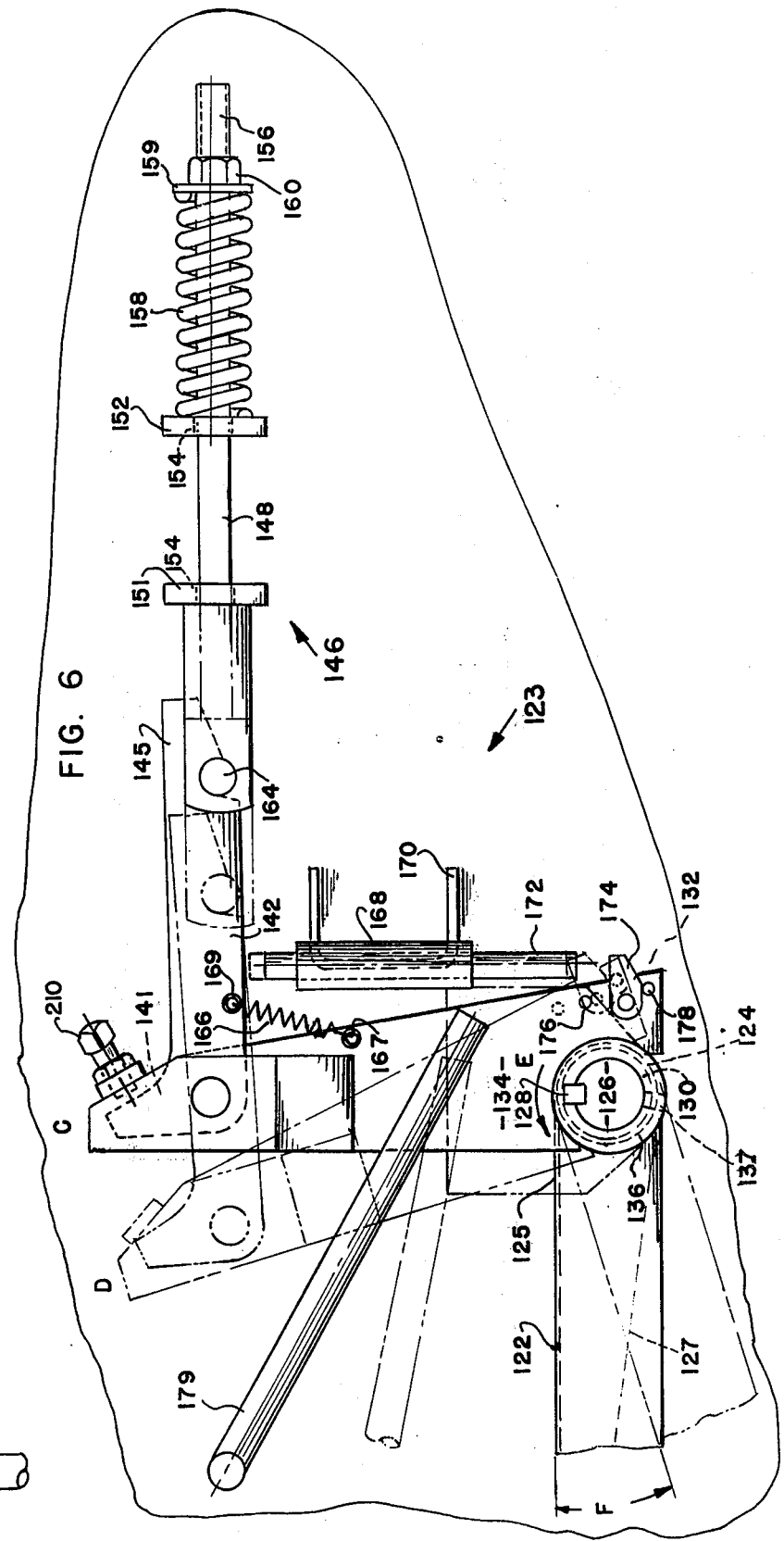

STONE TRAP FOR THRESHING AND SEPARATING MACHINE

BACKGROUND OF THE INVENTION

This invention relates to threshing and separating machines and more particularly to stone traps used in such machines.

Stone or rock traps are generally old and well known in the art. This is because of the damage stones can cause if they reach the threshing and separating area of such a machine. One type of stone trap presently used on commercial combines incorporates a trap door pivotally mounted to an overload release latch. The trap door is preferably located in the front portion of the concave under the threshing cylinder. When a stone enters the concave its weight trips the overload release latch causing the trap door to open and eject the stone to the ground. This type of stone trap has several limitations. Due to the tolerances inherent in this type stone trap, only larger stones, six inches or more in diameter, are detected and ejected. Smaller stones proceed into the threshing area causing damage to both the cylinder and the concave. Further, the vibrations inherent in this type of machine (i.e. a combine) prematurely disengage the release latch thereby opening the trap door causing a portion of the crop material to fall to the ground prior to entering the threshing and separating area. This inadvertent opening of the trap door can severely increase the total percentage of grain loss during the harvesting operation.

It is, therefore, the purpose of this invention to provide a stone trap for a threshing and separating machine which will eliminate the limitations discussed hereinabove.

OBJECTS AND SUMMARY OF THE INVENTION

The primary object of the present invention is to provide a stone trap for use with threshing and separating machines which will prevent stones from reaching the threshing and separating mechanism.

Another object of the present invention is to provide a stone trap for use in a threshing and separating machine which will not open prematurely due to the vibration created during the operation of these machine.

A further object of the present invention is to provide a stone trap for use in a threshing and separating machine having a door capable of moving through a series of closed positions prior to reaching its opened position.

The stone trap of the present invention is mounted in the crop elevator of a threshing and separating machine. The crop elevator has an opening positioned in its bottom portion along the path of the incoming crop material. A pivotally mounted door is positioned above the opening. A lip is rigidly mounted around the periphery of the opening and extends from the bottom of the crop elevator. This lip maintains the door in a closed position until the door has moved through a predetermined distance. The movement of the door is determined by the operation of a controlling means mounted to both the door and the crop elevator and a force exerting means operably associated with the controlling means. The force exerting means is mounted above and extends across the door to effect the operation of the controlling means, and thereby, movement of the door when it has encountered a solid object.

These and other objects and advantages of this invention will be apparent to those skilled in the art after a consideration of the following detailed description, taken in conjunction with the accompanying drawings, in which the preferred form of this invention is illustrated.

BRIEF DESCRIPTION OF THE DRAWINGS

FIG. 4 is a view taken along lines 4—4 of FIG. 2.

FIG. 6 is an enlarged view of the controlling means of the present invention.

FIG. 7 is a view taken along lines 7—7 of FIG. 6.

FIG. 8 is a side view of the crop elevator with the stone trap in one of its series of closed positions.

DETAILED DESCRIPTION OF THE PREFERRED EMBODIMENT

General

Figure 1:
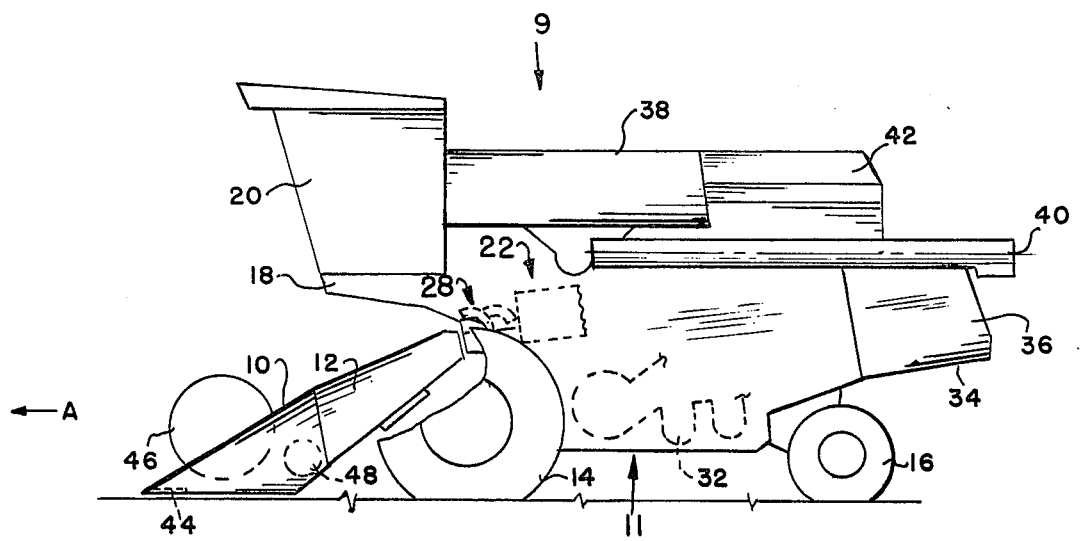
FIG. 1 is a side view of the combine.

In the following description, the right and left sides are referenced to the forward movement of the machine as indicated by arrow A in the drawings. The threshing and separating machine described herein is a self-propelled combine 9 shown in FIG. 1 of the drawings having a header 10 supported by crop elevator 12. The crop elevator 12, in accordance with the header 10, operates to deliver crop material from the field to the threshing and separating means of the combine. The combine 9 is mounted on frame 11 which is supported by a pair of large front drive wheels 14 and a pair of reel mounted steering wheels 16 (only one wheel of each pair being shown). Mounted to the front of the combine is the operator's platform 18 extending forwardly over crop elevator 12. A cab 20 encloses the platform and protects the operator from the dust, dirt and heat generally encountered during the harvesting operation.

The threshing and separating means 22 can extend transverse to the direction of travel of the combine, as in conventional combines, or in a fore-and-aft relationship as shown in FIG. 1. The particular configuration of the threshing and separating means has no relevance to the description of the present invention since either type can be used in conjunction with the invention. The forwardmost portion of the threshing and separating means contains a crop feeding means 28 which acts in direct communication with the crop elevator and header to deliver material from the field into the threshing and separating means. The crop cleaning means 32 is housed in the lower portion of the combine between the drive and the steering wheels. Chaff separated from the grain, by the cleaning means, and straw, exiting the threshing and separating means, are discharged through an opening 34 contained in rear hood 36 of the combine. A grain tank 38 is mounted on top of the combine for temporarily storing clean grain. An unloading auger 40 is mounted to the left side of the combine for discharging grain contained in the grain tank. Mounted to the rear of the grain tank is the engine 42 connected by various drives (not shown) to the threshing and separating means 22, the crop cleaning means 32, the drive wheels 14, the crop elevator 12 and the header 10.

The header 10, mounted on the frame and positioned at the forward end of crop elevator 12, has a sickle 44 and a reel 46 for gathering and cutting the standing crop material. A transverse auger 48 is positioned to the rear of reel 46 to consolidate the harvested crop material and deliver it to the crop elevator. The header is substantially wider then the combine and usually extends transversely to or beyond the drive wheels. The crop elevator 12 is usually narrower than the header for delivering material from the auger 48 upwardly and rearwardly to the crop feeding means 28. The crop feeding means feeds the material received from the crop elevator rearwardly into the threshing and separating means. The threshold and separated straw is discharged from the combine through opening 34, while the threshed grain is cleaned on the cleaning means 32. The clean grain is carried up and into the grain tank by a grain elevator (not shown).

Crop elevator

The inventive feature in this combine and described herein is a new and improved stone trap positioned in crop elevator 12. Although this invention is being described in connection with an axial flow type combine, it must be noted that it may also be used advantageously with a conventional combine having a transverse threshing cylinder.

Figure 2:
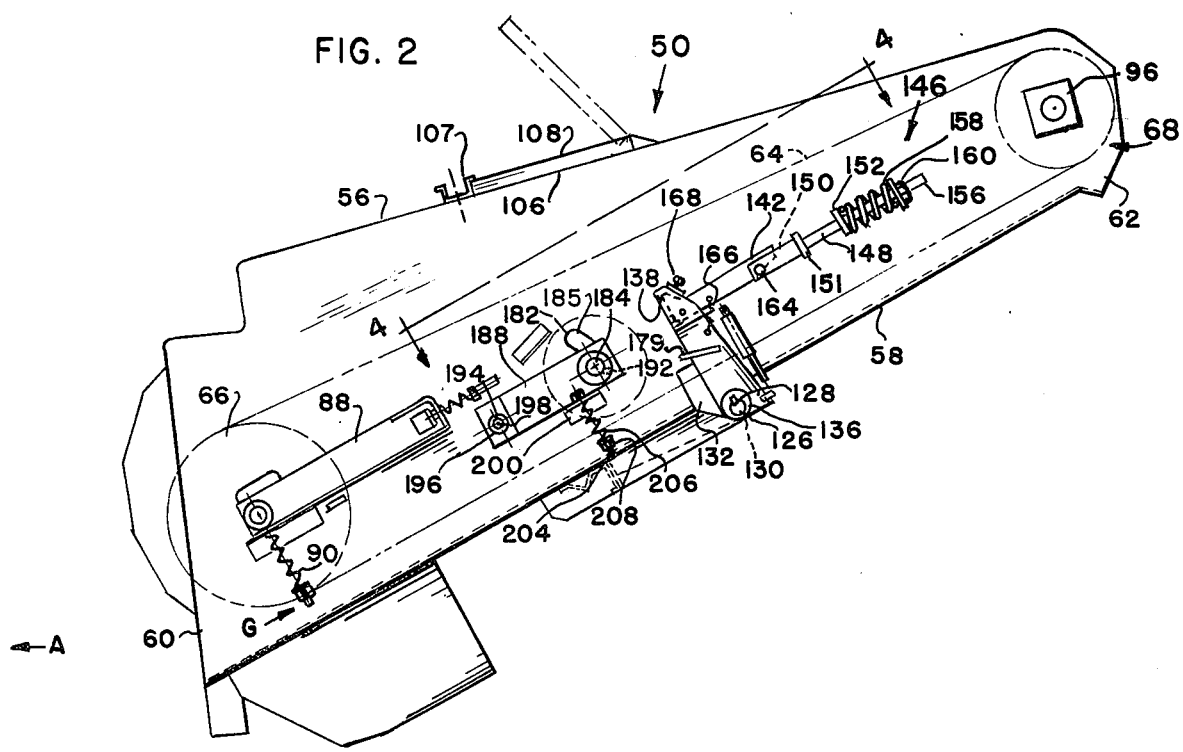
FIG. 2 is a side view of the crop elevator with the stone trap in a closed position.
Figure 5:
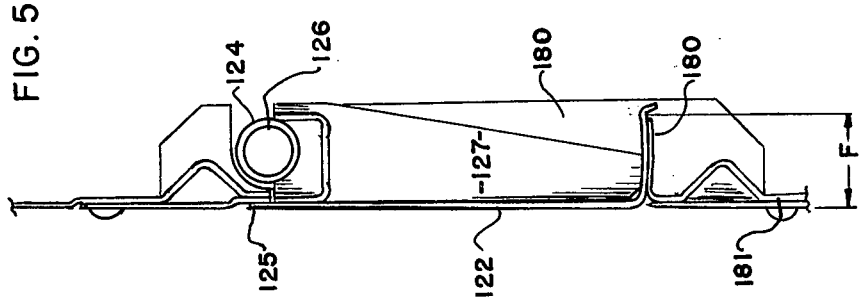
FIG. 5 is a view taken along lines 5—5 of FIG. 4.
Figure 3:
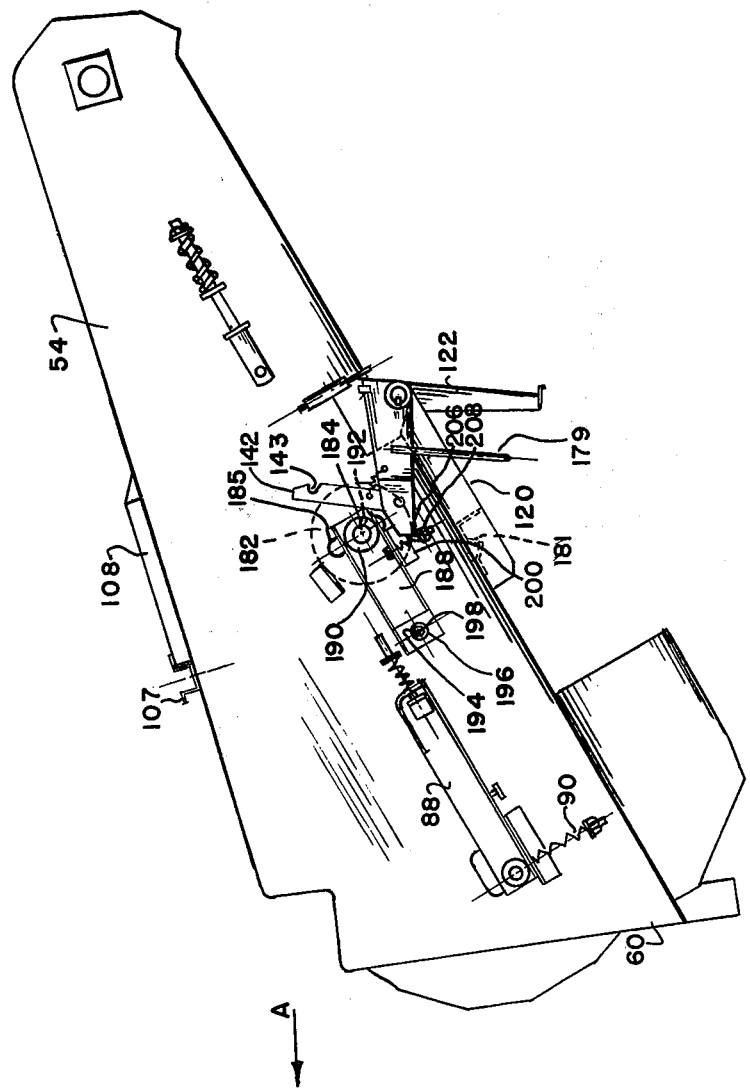
FIG. 3 is a side view of the crop elevator with the stone trap in its opened position.

The crop elevator is shown in detail in FIGS. 2–4 and comprises an outer rectangular-shaped housing or casing 50 having right and left sidewalls 52 and 54 and top and bottom walls 56 and 58, respectively. The cut crop material is received from the header through a front opening 60 and is discharged through a rear opening 62. Inside casing 50 is a chain and slat conveyor 64 rotatably mounted between sidewalls 52 and 54.

Chain and slat conveyor

The chain and slat conveyor 64 comprises a large hollow cylindrical drum 66 extending within the casing and across the front of the crop elevator immediately to the rear of front opening 60. A power transmitting sprocket means 68 is rotatably mounted to the rear of the casing immediately in front of rear opening 62. Three endless flexible chains 70, 72 and 74 are spaced across drum 66 and sprocket means 68. These chains ride on flanges 76, 78, 80 mounted on the drum and mesh with sprockets 82, 84, 86 of the sprocket means. The drum 66 is rotatably and pivotally mounted to arms 88 (only left arm being shown in the drawings) to enable the drum to respond to the amount of crop material fed into the crop elevator by the header. The arms are forced downwardly by spring 90 in order to maintain the drum against the upwardly pressing crop material. The sprocket means 68 has a shaft 94 extending within and across the casing and rotatably mounted to the sidewalls by bearings 96, 98. Sprockets 82, 84, 86 are spaced transversely across the shaft and mounted to the shaft. Shaft 94 extends beyond bearing 96 and has a slip clutch 100 keyed thereto with a drive sprocket 102 mounted on the slip clutch. The drive sprocket 102 is connected to sprocket 104 (which is driven by engine 42) through chain 106 to rotatably drive shaft 94 and thereby rotate sprockets 82, 84, 86. Extending across casing 50 and interconnecting chains 70, 72, 74 are rigid slats 104 which are alternatively spaced between the chains. These slats assist in engaging and directing the material, received from the header, into the threshing and separating means 22.

An opening 106 is included in top wall 56 of the casing above the chain and slat conveyor. The opening is covered by lid 108. This lid is pivotally mounted about its rear side and contains latches 107 to securely close the lid during the operation of the combine. The conveyor 64 is accessible through this opening thereby allowing the operator to perform minor repairs on the crop elevator without having to completely dismantle the elevator.

Stone trap

The stone trap of the present invention comprises an opening 120, shown in FIG. 3, positioned along the path of the crop material substantially in the center of the crop elevator. Positioned over opening 120 is door 122 which is capable of entirely closing the opening. The door is pivotally fastened to bottom wall 58 by controlling means 123. The controlling means acts to direct the movement of door 122 through a series of closed positions, as shown in FIG. 8, to an opened position, shown in FIG. 3. The controlling means comprises a tube 124 which extends below bottom wall 58 and beyond sidewalls 52 and 54. Door 122 has its rear edge 125 rigidly fastened to tube 124 (by welding or the like) so that any movement of the tube will impart a similar movement to the door. Rigid supports 127 are mounted to the underside of door 122 and transversely spaced across the door to increase the structural strength of the door. Stub shafts 126 (only left side being shown) are welded to the ends of the tube 124 and contain key seats (not shown). Tube 124 as well as stub shaft 126 are rotatably mounted in bearing 130 which is secured to sidewalls 52, 54 by mounting plates 132 (only the left sidewall 54 and the associated mounting plate being shown). A key (not shown) is inserted in the key seat over which a collar 136 is placed. Collar 136 contains a keyway 128 which cooperates with the key so that rotational movement of tube 124 will impart an identical rotational movement to the collar. Also contained in collar 136 is a set screw 137 which when tightened, prevents the collar from moving axially off the shaft.

A first lever arm 134 is rigidly mounted to collar 136 and positioned vertically from the collar as shown in FIG. 6. Rigidly mounted and extending from the first lever arm is bracket 138. This bracket along with the lever arm forms a clevis 139 through which pin 144 is inserted. A second lever arm 142 has an opening in end 141 through which pin 144 passes thereby pivotally mounting the second lever arm to the first lever arm. End 145 of the second lever arm contains a V-shaped notch 143 which acts in cooperation with a spring assembly 146 to retard the movement of the levers and thereby the door as the door moved through its series of closed positions.

As shown in FIGS. 6-7, spring assembly 146 is comprised of brackets 151, 152 (only left side being shown) each having one end secured to the respective sidewall of the casing. The brackets contain holes 154 adapted to receive rod 148 therethrough. The rod has a threaded end 156 and clevis end 150. A spring 158 is placed around rod 148 and to the rear or bracket 152. A washer 159 and locknut 160 are placed on threaded end 156 behind spring 158. Movement of nut 160 towards rear bracket 152 (i.e. forward movement increases the spring tension and thereby the force acting against the forward movement of clevis end 150. The clevis end contains a pin 164 which bridges gap 165 of the clevis. It is the engagement of this pin by V-shaped notch 143 of the second lever arm which latches and connects the lever arms to the spring assembly.

Acting to maintain the relative positions of the lever arms to each other is spring 166. This spring has end 167 mounted to the first lever arm while end 169 is mounted to the second lever arm so that a downward force is maintained on the second lever arm thereby forcing the V-shaped notch to remain in its latched position in clevis 150. This downward force is necessary since there is a tendency for the V-shaped notch to ride up and off of pin 164 when the first lever arm is moved from position C to position D, as shown in FIGS. 6 and 8.

Positioned immediately to the rear of the first lever arm 134 is cylinder 168. This cylinder is rigidly mounted on the respective sidewall of the casing by mounting bracket 170. Freely inserted within cylinder 168 is pin 172 which extends beyond the ends of the cylinder. Leg 174 is pivotally mounted to lever arm 134 and positioned directly below pin 172 to activate the pin. This leg is movable between an upper stop 176 and a lower stop 178 so that regardless of the movement of lever arm 134 the leg will remain positioned beyond the rear end of lever 134. As shown in FIGS. 6 and 8, when the first and second lever arms have moved from position C to position D, leg 174 forces pin 172 up into contact with the lower edge of lever arm 142. Position D, illustrated in FIG. 8, is the furthest distance the lever arms can travel before pin 172 pushes the V-shaped latching notch of the second lever arm out of engagement with clevis pin 164 of the spring assembly. As shown in FIG. 3, once pin 172 disengages the second lever arm from the spring assembly the combination of the first and second lever arms, as well as tube 124, rotates in counterclockwise direction E (as viewed from the left side of casing 50) thereby opening door 122.

Rigidly mounted around the periphery of opening 120 and extending below the opening is lip 180. The forward section of the lip has a flange 181 which is secured to bottom wall 58 by a bolt and washer assembly 181. The side sections of lip 180 are welded to either side of the opening. This lip extends across the front and sides of the opening. The lip prevents door 122 from being opened prior to its movement beyond a predetermined distance. This predetermined distance is the distance F, shown in FIG. 5–8, which is equal to the height of the lip. This predetermined distance is also equal to the distance the forward end of door 122 moves during the movement of the lever arm from position C to position D. That is to say that, the movement of the lever arm from position C to position D corresponds to the height of lip 180. Until the door passes through distance F, it remains closed thereby preventing any crop material passing over the door from being discharged. This type of construction allows the door to move through a series of closed positions (corresponding to movement of the controlling means 123 from position C to position D) prior to opening. This freedom of the door to vacillate between a series of closed positions prevents the door from inadvertently opening due to vibrations generated during the operation of the combine. Further, this type of construction prevents small stones (which do not effect the threshing and separating means) passing over the door, from opening the door and causing numerous unnecessary shutdowns by the operator to reset the door.

A handle 179 is rigidly mounted and extends forwardly from first lever arm 134. This arm enables the operator to rotate the lever arms in a clockwise direction (as viewed from the left side of the combine) to reset the V-shaped notch of the second lever arm over pin 164 after the door has been opened. In order to maintain the second lever arm in substantially perpendicular relationship to the first lever arm, a set screw 210 is mounted between bracket 138 and the outer face of first lever arm 134. This screw adjusts the position of the second lever arm to maintain the lever arms in perpendicular relation to each other even after the second lever arm is disengaged from the spring assembly and the door has opened, as shown in FIG. 3.

Rotatably mounted directly above openings 120 is roller 182. This roller extends above and across chain and slat conveyor 64. A rod 184 passes through roller 182 and extends through slots 185 in sidewalls 52, 54. Rod 184 is mounted in bearings 186 mounted to either end of roller 182. This type of mounting arrangement allows the roller to rotate while the shaft remains stationary. Each end of rod 184 is mounted to bracket 188. This bracket contains a coller 190 welded to one end. The coller is placed over the ends of rod 184 passing through arcuate slots 185 and secured to the rod by set screw 192. The other end of bracket 188 is pivotally secured to the respective sidewall by bolt 194 which passes through both the sidewall and the bracket. A washer 196 and a nut 198 are placed on the threaded end of bolt 194 to maintain the bracket in proper position with respect to the sidewalls of the casing. The lower portion of bracket 188 rests on stop 200 which is rigidly mounted and extends from the sidewalls. An aperture (not shown) extends through both the lower portion of the bracket and the stop through which a bolt 204 passes. A downward force is exerted on roller 182 by spring 206 positioned around the bolt between the stop and the head of the bolt. This spring also assists in maintaining the roller in its position above door 122. A nut 208 is secured to the top of the bolt above stop 200. Adjustment of nut 208 can increase or decrease the downward force exerted on roller 182.

OPERATION

The harvested crop material is fed by consolidating auger 48 of the header through front opening 60 of the crop elevator. Once in the crop elevator, the material is engaged by the chain and slat conveyor 64 which moves the material between slats 104 and bottom wall 58, along the path illustrated in FIG. 2, by arrow. G. As the crop material is conveyed along bottom wall 58, it passes under roller 182. This roller is positioned above the conveyor in the path of the crop material so that a mat of crop material of normal thickness can pass freely between the roller and the bottom wall. Often, during the harvesting operation, solid objects are conveyed through the header and crop elevator into the threshing and separating means. The roller is positioned above the conveyor so that solid objects having a diameter greater than the distance between the outer periphery of the roller and the bottom wall will engage the roller, thereby exerting a downward force against the objects and on door 122. This downward force exerted on the solid object is generated by spring 206. The tension of spring 206 is greater than that of spring 158, used with spring assembly 146, so that the controlling means will move, rather than roller 182, from position C to position D depending upon the size of the object in contact with the roller. If the object is large enough to cause door 122 to move pass position D, as shown in FIG. 6, leg 174 will move pin 172 against the bottom edge of the second lever arm causing the V-shaped notch 143 to be disengaged from pin 164. Once disengagement has occurred, door 122 immediately opens (as shown in FIG. 3) allowing the solid object to be ejected from the crop elevator. When the door opens, the operator is alerted by means of an electric signal to stop the combine and reset the door by latching the V-shaped notch 143 to pin 164 by rotating handle 179 in a clockwise direction, as viewed from the left hand side of the combine, as shown in FIG. 6. It is important to note that the door remains closed until it has moved through a predetermined distance equal to the height of lip 180. This predetermined distance also corresponds to the movement of the door when the controlling means has moved from a position C to position D. Therefore, as shown in FIG. 8, if the solid object engaging the roller is not large enough to move the door beyond position D, the door will remain closed and the object will continue to be conveyed up along the bottom wall of crop elevator. The roller's position with respect to the bottom wall of the crop elevator and the height of lip 180 determine exactly what size object will cause the door to move through the above described predetermined distance. It has been determined that objects less than 3 inches in diameter would have no harmful effect on the threshing and separating means of the combine. Therefore, the usual setting of the present invention is such that objects having a diameter greater than three inches will cause the door to move through its series of closed positions (i.e. through the predetermined distance) to its opened position.

While the preferred structure in which the principle of the present invention have been incorporated is shown and described above, it is to be understood that the invention is not to be limited to the particular details, shown and described above, but that, in fact, widely different means may be employed in the practice of the broader aspects of the invention.

Having described the invention, what is claimed is:
1. A threshing and separating machine comprising:
   a. a frame adapted to travel across a field,
   b. means mounted on the frame to thresh and separate grain from crop material,
   c. means mounted on said frame for elevating crop material from the field to said threshing and separating means, the elevating means having a door pivotally mounted along the path of the crop material and adapted to move between a closed and an opened position,
   d. means operably associated with said elevating means for controlling the movement of said door between its closed and opened positions, and
   e. means operably associated with the controlling means and supported by said elevating means adjacent the path for exerting a force against solid objects in said path, said force affecting operation of said controlling means to open said door and eject solid objects under conditions where said objects travel along said path in the vicinity of said door.
2. A threshing and separating mechine comprising:
   a. a frame adapted to travel across a field,
   b. means mounted on the frame to thresh and separate grain from crop material,
   c. means mounted on said frame for elevating crop material from the field to said threshing separating means, the elevating means having a door pivotally mounted along the path of the crop material and adapted to move between a closed and an opened position,
   d. means operably associated with said elevating means for controlling the movement of said door between the closed and opened positions, and
   e. means operably associated with the controlling means and including roller means supported by said elevating means adjacent the path and extending across and above said door for exerting a force against solid objects in said path, said force effecting operation of said controlling means to open said door and eject solid objects under conditions where the objects travel along said path in the vicinity of said door.
3. A threshing and separating machine, as described in claim 2, wherein said elevating means includes a casing having open end portions and top, bottom and side portions, the bottom portion containing said door, and
   means movably mounted within the casing for conveying material through said casing and across said door.
4. A threshing and separating machine, as described in claim 3, wherein the conveying means includes a plurality of endless flexible members rotatably mounted within said casing above said door and spaced across said casing, and means mounted to and interconnecting the flexible members for engaging and directing said crop material.
5. A threshing and separating machine comprising:
   a. a frame adapted to travel across a field,
   b. means mounted on the frame to thresh and separate grain from crop material,
   c. means mounted on said frame for elevating crop material from the field to said threshing and separating means, the elevating means having an opening positioned along the path of the crop material,
   d. a door pivotally mounted over the opening and adapted to move between a series of closed positions and an opened position,
   e. means mounted adjacent the periphery of said opening and extending from the bottom of said elevating means to prevent the opening of said door until said door has moved through a predetermined distance,
   f. means operably associated with said elevating means to control the movement of said door between the series of closed positions and the opened position, and
   g. means operably associated with the controlling means and supported by said elevating means adjacent the path and in the vicinity of said door for exerting a force against solid objects in said path, said force effecting operation of said controlling means to open said door and eject solid objects under conditions where the objects travel along said path in the vicinity of said door.
6. A threshing and separating machine, as set forth in claim 5, wherein said means mounted in the vicinity of said opening comprises a lip rigidly mounted below and extending around the sides of said opening.
7. A threshing and separating machine, as set forth in claim 5, wherein the controlling means comprises a first lever having one end mounted to said door so that movement of said door will impart movement to the lever, a second lever having one end mounted to the other end of said first lever and a latching end extending away from the one end of the second lever, a spring assembly having one end mounted to said elevating means and another end adapted to be connected to the latching end of said second lever, and means operably associated with both said first and second levers to disengage the other end of the spring assembly from said latching end of said second lever under conditions where said first lever has moved through a predetermined distance.

8. A threshing and separating machine, as set forth in claim 7, wherein said predetermined distance is equaled to the distance said first lever travels when said door has cleared the lip.

9. A threshing and separating machine, as set forth in claim 7, wherein the disengaging means includes a pin movably mounted to said elevating means, and an activating member mounted to said first lever and adapted to push the pin against said second lever thereby disengaging said latching end of said second lever from said other end of said spring assembly.

10. A threshing and separating machine comprising:
  a. a frame adapted to travel across a field,
  b. means mounted on the frame to thresh and separate grain from crop material,
  c. means mounted on said frame for elevating crop material from the field to the threshing and separating means, the elevating means comprising a casing having open end portions, and top, bottom and side portions, the bottom portion having an opening positioned along the path of the crop material, a door pivotally mounted over the opening and adapted to move between a series of closed positions and an opened position, and means movably mounted within the casing above the door for conveying material through said casing across said door,
  d. means mounted adjacent the periphery of said opening and extending from said bottom portion to prevent the opening of said door until said door has moved through a predetermined distance,
  e. means operably associated with said door to control the movement of said door between the series of closed positions and the opened position, and
  f. means operably associated with the controlling means and pivotally mounted to the side portions of said casing and positioned above and across said door for exerting a force against solid objects in said path, said force effecting operation of said controlling means to move said door through said series of closed positions to said opened position and to eject solid objects under conditions where said objects travel along said path in the vicinity of said door.

11. A threshing and separating machine, as set forth in claim 10, wherein the forcing means comprises a roller pivotally mounted to said side portions and extending across said door above the conveying means, and means operably associated with the roller for maintaining said roller in a position above said door.

12. A threshing and separating machine, as described in claim 11, wherein the maintaining means includes at least one spring mounted between said side portion and the said roller.

13. In a threshing and separating machine having a frame adapted to travel across a field, means mounted on the frame to thresh and separate grain from crop material, means mounted on said frame for elevating crop material from the field to said threshing and separating means, the elevating means having an opening positioned along the path of the crop material, a door pivotally mounted over the opening and adapted to move between a series of closed and an opened position, wherein the improvement comprises: means mounted adjacent the periphery of said opening and extending from the bottom of said elevating means to prevent the opening of said door until said door has moved through a predetermined distance, means operably associated with said elevating means to control the movement of said door between the series of closed positions and the opened position of said door, and a roller pivotally mounted to said elevating means and extending above and across said door for exerting a force against solid objects in said path, said force effecting operation of said controlling means to move said door through said series of closed positions to said opened position and to eject solid objects under conditions where said objects travel along said path in the vicinity of said door.

* * * * *